INVENTOR.
Howard C. Fautz
BY Bernard Kriegel
Attorneys.

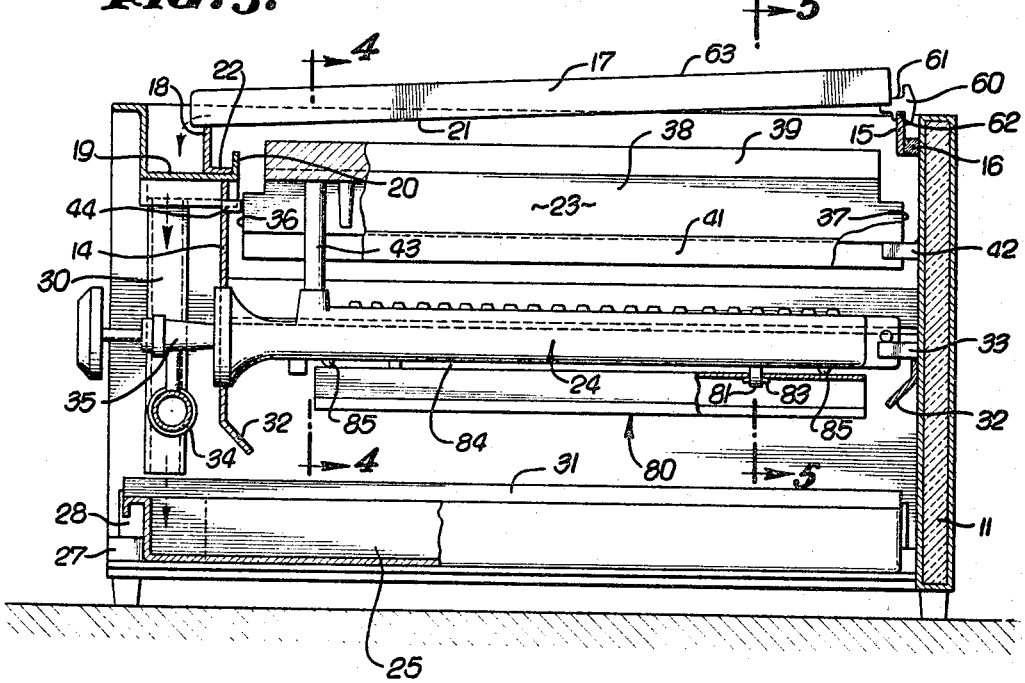
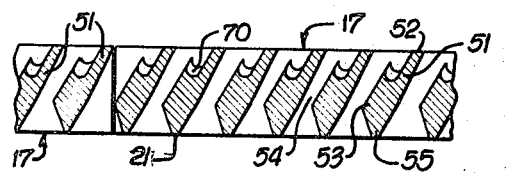
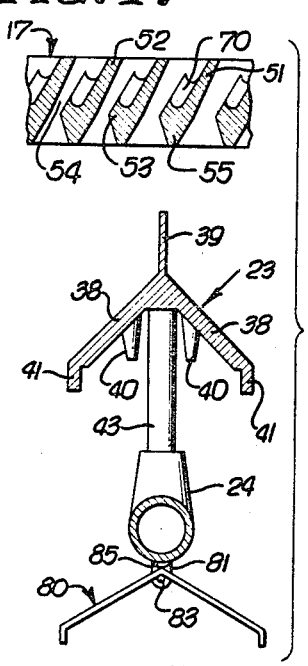
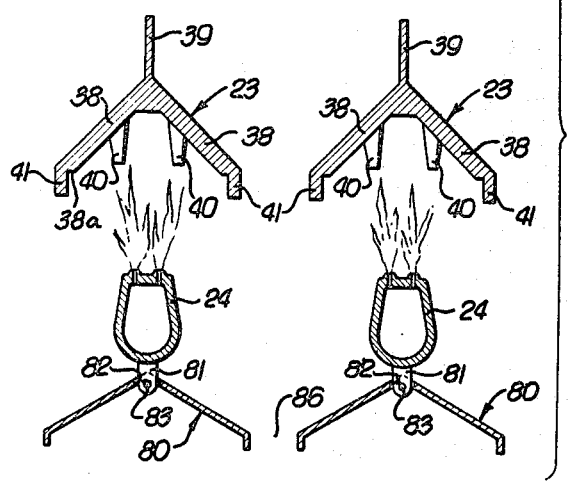
INVENTOR.
HOWARD C. FAUTZ
BY Bernard Kriegel
ATTORNEYS.

Dec. 31, 1968  H. C. FAUTZ  3,418,921
BROILER
Filed April 25, 1966  Sheet 3 of 3
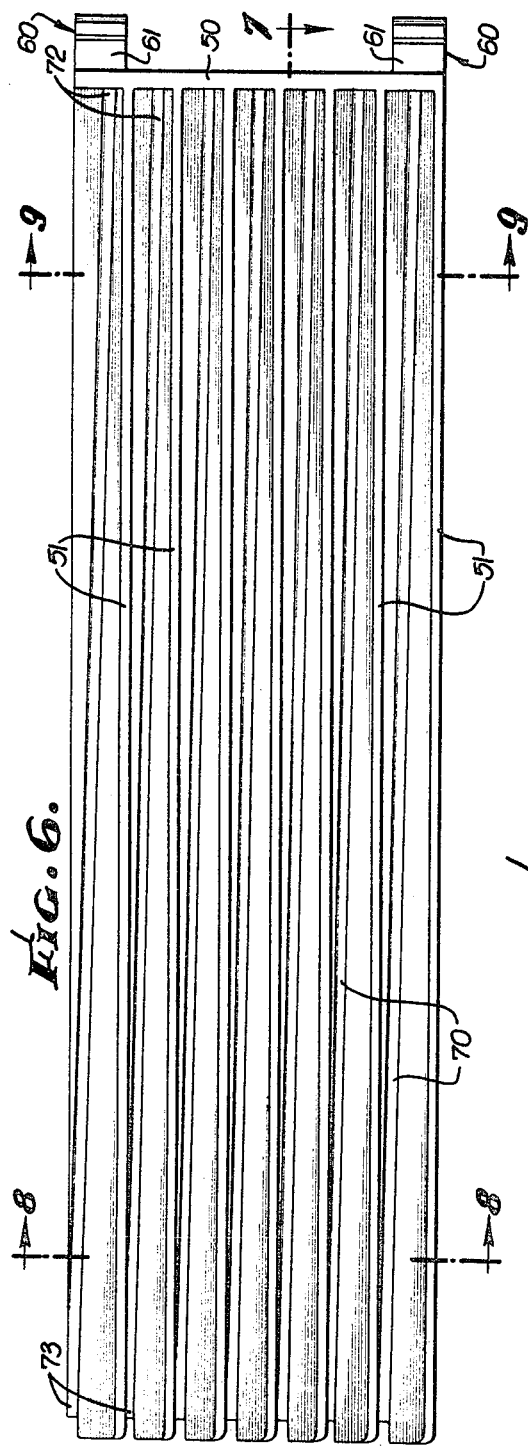
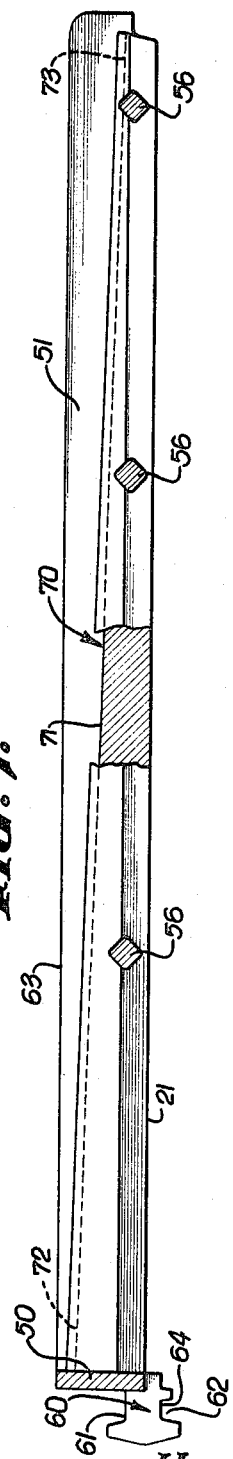
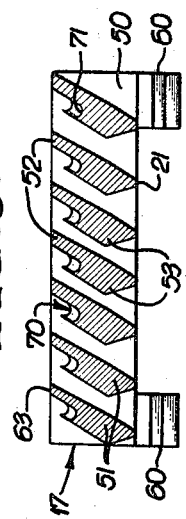
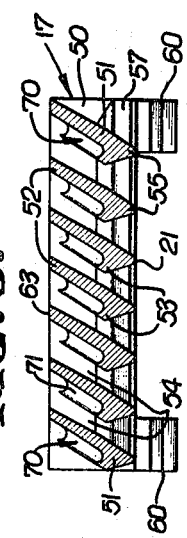
INVENTOR.
HOWARD C. FAUTZ
BY Bernard Kriegel
ATTORNEYS.

United States Patent Office 3,418,921
Patented Dec. 31, 1968

3,418,921
BROILER
Howard C. Fautz, Long Beach, Calif., assignor to Vulcan-Hart Corporation, Baltimore, Md., a corporation of Indiana
Filed Apr. 25, 1966, Ser. No. 544,761
25 Claims. (Cl. 99—445)

ABSTRACT OF THE DISCLOSURE

A broiler including a grid of parallel bars with inclined channels conducting grease to a main collecting channel. A supplementary collecting channel receives grease flowing along the bottom of the grid bars. Radiants below the grid are supported partially by burners therebelow, the burners also supporting heat baffles therebelow.

---

The present invention relates to food cooking apparatus, and more particularly to cooking apparatus for broiling meats, poultry, and the like.

Gas-fired broiler units have been provided in which the gas burners heat radiants thereabove, which, in turn, heat the food product or products on a grill or grid supported above the radiants. A drip pan may be disposed below the burners for catching and collecting fats, and the like, dripping from the heated food products.

In prior broiler units, grease flow from the grid and food products and its collection have been largely ineffective, resulting in the dropping of large quantities on the hot radiants, which may generate a fire capable of engulfing and burning the food products on the grid thereabove. The absence of proper direction of grease flow and its collection results in relatively rapid incrustations forming on the grid. In addition, prior grid structures have been difficult to clean and to maintain in a clean condition.

The efficiency of prior broiler units have been low, caused by extensive convection and radiation heat losses through the upper grid. Other factors contributing to low efficiency are the radiation and convection of heat in a downward direction to the region of the lower drip pan, heating the pan and its contents to an undesirably high temperature. Heat has also been lost by conduction and other forms of heat transfer to the front of the unit, greatly and undesirably elevating the temperature of the gas valves, gas manifold, and other devices. Expansion and contraction of the radiants has also been limited, resulting, at times, in their damage. The temperature has varied greatly over the area of the grid, producing a non-uniform rate of broiling of the food products placed thereon. A contributing factor has been air currents tending to flow or blow transversely across the radiants.

Accordingly, it is an object of the invention to provide a broiler unit having a food supporting grid that possesses a greater efficiency of operation, and which is capable of operating with a substantially lower heat input.

Another object of the invention is to provide a broiler unit having a food supporting grid, in which the grid can be heated or brought up to operating temperature more rapidly.

A further object of the invention is to provide a broiler unit having a food supporting grid, in which grease and other liquid substances from the food on the grid are caused to flow along the grid to a desired collecting point, greater flow along the grid being secured with a less tilt of the grid to the horizontal, and, if desired, with no tilt at all of the upper grid surface.

Yet another object of the invention is to provide a broiler unit having an inclined food supporting grid to facilitate gravity flow of grease to a desired collecting point, the grid being easily inverted to provide a horizontal upper surface for supporting pots, and the like.

Still a further object of the invention is to provide a broiler unit having a food supporting grid, in which an improved supporting arrangement is provided for limiting forward and rearward movement of the grid.

An additional object of the invention is to provide a broiler unit having a grid that is capable of being cleaned in a comparatively easy manner.

Another object of the invention is to provide a broiler unit having a grid comprising grid bars, in which grease can be collected from the bottom of the grid bars as well as from the upwardly directed surfaces of the grid bars.

Yet another object of the invention is to provide a broiler unit embodying radiant members heated by a suitable source, in which the radiant members are permitted to expand and contract freely, thereby preventing their being damaged due to changes in their thermal state.

A further object of the invention is to provide a broiler unit embodying radiant members heated by a suitable source, in which transfer of heat from the radiant members to the front of the unit is greatly reduced, thereby insuring the maintenance of the gas manifold, gas valves, grease collecting regions, etc., at the front of the unit at a reduced temperature.

Still a further object of the invention is to provide a broiler unit embodying a food supporting grid and radiant members therebelow heated by a suitable source, in which the temperature over the full area of the grid is substantially uniform.

Another object of the invention is to provide a broiler unit embodying a food supporting grid and radiant members therebelow heated by a suitable source, in which the temperature of the unit below the source of heat is maintained at a relatively low level. Accordingly, if a drip pan is disposed below the burners, or other heat source, the temperature of its contents will be comparatively low.

Yet a further object of the invention is to provide a broiler unit embodying a food supporting grid and radiant members therebelow heated by a suitable source, in which the heat loss to regions of the unit below the heat source is reduced considerably.

This invention possesses many other advantages, and has other objects which may be made more clearly apparent from a consideration of a form in which it may be embodied. This form is shown in the drawings accompanying and forming part of the present specifications. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 3 is an enlarged vertical section taken along the line 3—3 on FIG. 2;

FIG. 4 is an enlarged section taken along the line 4—4 on FIG. 3;

FIG. 5 is an enlarged section taken along the line 5—5 on FIG. 3;

FIG. 6 is a top plan view, on an enlarged scale, of a grid section;

FIG. 7 is a cross-section taken along the line 7—7 on FIG. 6;

FIG. 8 is a cross-section taken along the line 8—8 on FIG. 6;

FIG. 9 is a section taken along the line 9—9 on FIG. 6;

Figure 1:
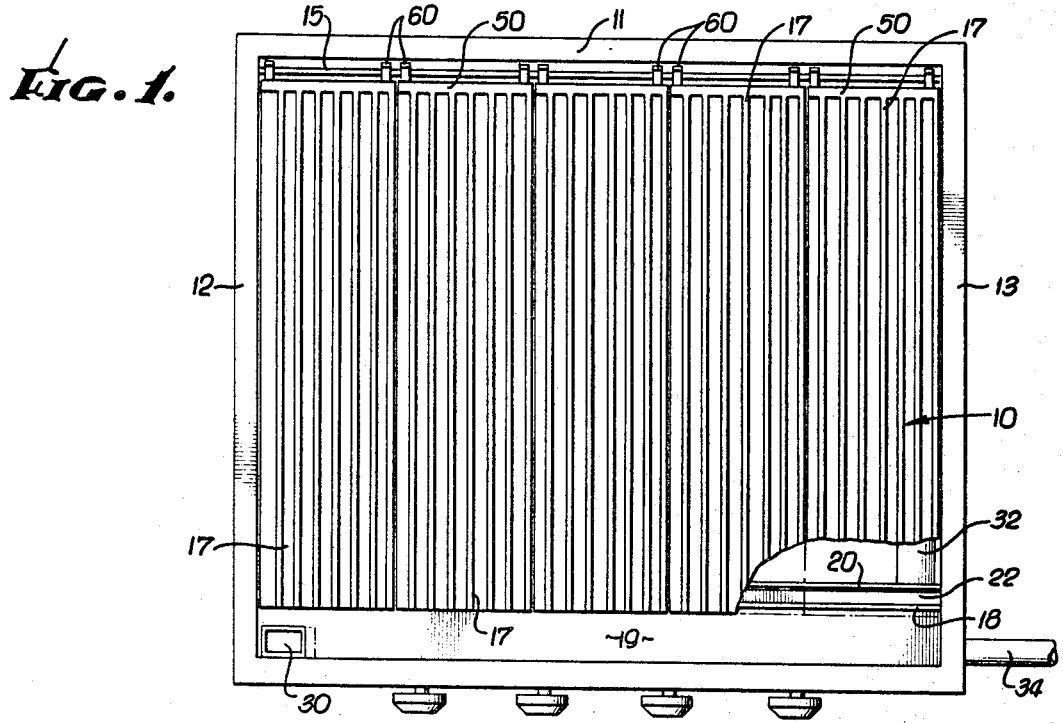
FIGURE 1 is a top plane view of a broiler unit embodying the invention.
Figure 2:
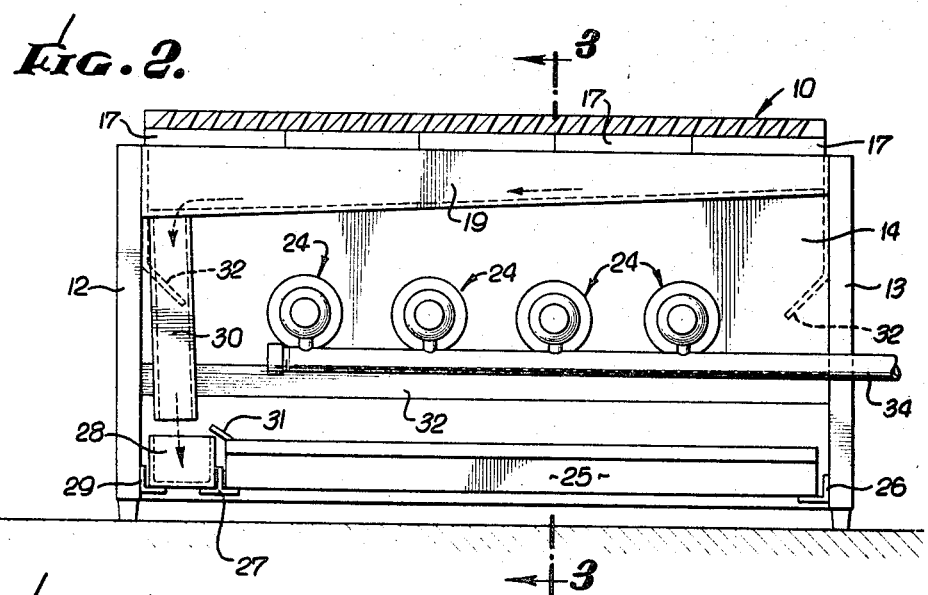
FIG. 2 is a front elevation of the broiler unit disclosed in FIG. 1.

A char broiler type of unit is illustrated in the drawings for cooking food placed upon a grid 10 supported at the top of the unit. The unit includes a rear wall 11, side walls 12, 13, and a front wall and heat baffle 14. A rear grid support in the form of a bar 15 extends along the upper portion of the rear wall and is suitably secured in spaced relation thereto, as by providing intervening spacer members 16. The grid or grill 10 is preferably formed in sections 17, the rear portion of each section resting upon the rear support 15, with the front of each grid section resting upon a front support 18, which is generally L-shaped in cross-section, the front supporting member 18 resting upon the bottom of a main or primary gutter 19 extending along the front of the unit and suitably supported by its front wall 14. The main gutter 19 is of channel-shape and includes an upwardly extending rear flange 20 spaced from the lower surface 21 of the grid sections, forming with the front support 18 a sub or secondary gutter or channel 22 into which grease from the lower surfaces 21 of the grid can drop.

Although the secondary channel or gutter 22 is disclosed as being supported by the bottom of the main or primary gutter or channel 19, the portion of the channel 19 forwardly of the support 18 constitutes and functions as a main grease collecting channel, while the channel 22 rearwardly of the support 18 constitutes and functions as a supplementary grease collecting channel.

Mounted below the grid sections 17 are a plurality of parallel, spaced radiants oor radiant members 23, which are heated by burning a gaseous fuel emanating from a plurality of parallel gas burners 24 therebelow, there being one gas burner for each of the radiants. Below the burners 24 is a drip pan 25 into which melted fats and other grease-like or liquid substances from the food on the grid 10 can drop. This grease pan is slidably supported along its sides by angle and T-shaped members 26, 27 of any suitable type secured to the frame of the unit, the drip pan extending from one side 13 substantially to the other side 12, there being a grease can 28 slidably supported on the inverted T-shaped supporting member 27 and on a suitable angle support 29 attached to the other side 12 of the frame of the unit. Grease from the primary and secondary gutters 19, 22 will flow from one side 13 of the unit along the sloping bottom of the gutters to the other side 12, dropping into a grease chute 30, the lower end of which is disposed immediately above the grease can 28. The drip pan 25 has an inclined bridge or deflector 31 extending from its front to its rear and overlying the adjacent side of the grease can 28 so as to prevent grease from dropping between the grease can and the drip pan. The front 14, rear 11, and sides 12, 13 have deflectors 32 inclined downwardly and inwardly to direct the drippings into the drip pan 25 and grease can 28.

The front of each burner 24 is suitably supported in a known manner from the front wall 14, with its rear portion resting upon a suitable bracket 33 secured to the rear wall 11 of the unit. A manifold 34 extends across the unit forwardly of the front wall, and communicates with a gas valve 35 for each burner, which is operated from the front of the unit in a known manner.

Mounted above each burner 24 is one of the radiants 23, which can be made of cast iron, carborundum, or the like. As disclosed, each cast iron radiant extends from the front to the rear walls 14, 11 of the unit, with its front end 36 and rear end 37 in spaced relation with respect thereto. Each radiant is of generally inverted Y-shape in cross-section, the arms 38 of the Y converging in an upward direction, and merging into a vertical heat baffle or central fin 39 extending along substantially the entire length of the radiant. Depending rod portions 40 are cast integrally with the arms 38 of the radiant to absorb heat from the fuel burning at the underlying burner 24. The lower ends of the arms 38 merge into relatively short parallel side flanges 41, upper shoulders 38a at the lower ends of the arms resting upon a suitable bracket 42 fixed to the rear wall 11 of the unit. The front portion of each radiant rests upon a vertical pin 43 fixed to and extending upwardly from the burner 24, the upper end of the pin engaging the radiant at the region where the arms 38 meet. The rear of the radiant can slide along the rear bracket 42, and the front of the radiant can slide along the upper end of the burner supporting pin 43. Forward movement of the radiant 23 is limited by a spacer tube 44 fixed to the front wall 14 of the unit to insure a space between the radiant and the front wall, thereby preventing heat transfer by conduction from the radiant to the front wall, which would effect substantial elevation of temperature of the front wall 14 and of the gutters 19, 22, manifold 34, and valves 35 forwardly thereof.

In the specific broiler unit illustrated in the drawings, the grid sections 17 are disposed above the radiants 23, the radiants being spaced laterally from one another, but the grid sections substantially abutting one another. As shown, each grid section 17 comprises a rear tie bar 50 integral with forwardly extending, parallel grid bars 51, which are in spaced parallel relation to one another and which are inclined to the vertical so that the upper end 52 of one bar overlaps the lower portion 53 of an adjacent bar, there being substantial space 54 between the bars through which heated air and products of combustion from the burners 24 can pass. The lower ends 55 of the bars are beveled to the central plane of each bar so as to facilitate the flow of heated air and products of combustion into the spaces 54, and also to expose a greater surface of an adjacent bar to radiant heating from the underlying radiant member 23. There is no tie bar at the front of the grid bars 51, the adjacent spaces or passages 54 between the bars being open at their front ends. However, a plurality of spaced, transverse tie bars 56 are integral with and interconnect the lower portions of the grid bars 51 to hold them in spaced relation and to restrict their warping or other undesired deflection. The tie bars 56 at one side of each grid section 17 project from the adjacent surface of a grid bar 51 to form spacer lugs 57 adapted to engage the end tie bars of an adjacent section and thereby space the confronting grid bars 51 of adjacent sections from one another to substantially the same extent as the grid bars of each section are spaced from one another. In effect, the grid bar sections 17 collectively form a single grid or grill unit 10, in which adjacent grid bars 51 are spaced from one another across the entire width of the broiler unit.

Figure 10:
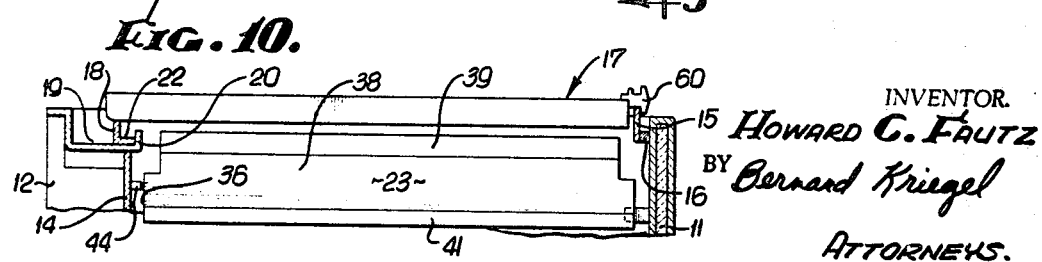
FIG. 10 is a view, on a reduced scale, and corresponding to FIG. 3, of the upper portion of the broiler unit, with the grid in an inverted position.

The grid bars 51 at the front of each grid section 17 rest upon the forward support 18. The rear of each grid section is carried by the rear support 15 by a pair of rear support lug elements 60 integral with the lower portion of the tie bar 50 and having upper and lower grooves 61, 62 formed therein. When the unit is used for broiling meats, and the like, placed upon the upper surfaces 63 of the grid bars, the latter are held in an inclined condition since the base 64 of the normal downwardly facing grooves 62 is disposed below the plane of the lower sides or surfaces 21 of the grid bars and will elevate the rear of the grid bars 51 with respect to their front. However, if a grid section 17 is inverted, the normal upper sides 63 at the front of the grid bar will the engage the forward support 18, but the normally upwardly facing groove 61 will now be disposed over the rear support 15, which will place the rear ends of the grid bars in a lower position, and, in fact, will place the upwardly facing sides 21 of the inverted grid bars in a horizontal plane, as disclosed in FIG. 10. Accordingly, pots, pans, and the like, can be supported on the inverted grid surfaces 21 in an appropriate level position.

Regardless of the normal upright or inverted positioning of the grid sections 17, their forward and rearward movement is restricted since the foward and rearward sides of the lower groove 62 or the upper groove 61, as the case may be, will engage the confronting forward and rearward sides of the rear grid support or bar 15. No significant forward and rearward movement of the grid sections can occur.

Each grid bar 51 has a sloping gutter or channel 70 cast therein, the bottom 71 of each gutter and channel sloping in a downward and forward direction from the upper side 63 at the rear of each grid bar toward its lower side 21 at the front of each grid bar. In effect, the bottom 71 of the channel not only slopes in a downward direction from rear to front, but is also disposed diagonally across each bar from its rear upper corner 72 to its forward lower corner 73. The melted fats and other grease from the food disposed on the grid 10 will flow downwardly along the channelled face of each bar 51 to the bottom 71 of the channel, and, in view of the slope or inclination of the channel 70 with respect to the upper side 63 of each grid bar, the melted grease is subject to a greater gravity action with lesser tilt of the bars 51 to the horizontal, facilitating the flow of the grease to the forward portion of the unit where it will drop into the main or primary gutter 19. In fact, if it were assumed that the upper surfaces 63 of the grid bars were horizontal, the channels 70 would still slope from the rear to the front of the unit, causing the liquid grease to flow by gravity toward the front of the unit and drop into the main gutter or grease collecting channel 19.

Substantially all of the melted fats and other grease and liquid particles from the food supported on the grill will flow along the upwardly facing surfaces of the grid bars 51 and into their channels 70, then flowing downwardly along the channels or gutters to the main gutter 19. A certain quantity of the fluid substances will flow along the grid bars 51 to their bottom portions 21, and, in view of the inclination of the grid bars from the rear to the front of the unit, they will pass downwardly over the upper end of the flange 20 and drop into the sub or secondary gutter 22. Very little of the fats, and other drippings, will pass between the grid bars and drop onto the hot radiants 23. As a result, the fats will not drop in sufficient quantities onto the radiants as to produce a flame of any material size. It is found that the grid bar and channel ararngement illustrated results in the collection of 75 percent or more of the melted fats and other substances dripping from the meat or other food products placed upon the grid sections 17.

The central vertical heat baffles or fins 39 projecting upwardly from the main portion of each of the radiants 23 insures a uniform distribution of heat over substantially the entire area of the grid 10 mounted thereabove. Ambient air tends to flow sidewise across the unit, and, in the absence of the fins 39, could produce a cooling action, particularly at the sides of the unit. The fins 39 function as vertical baffles and prevent currents of ambient air from flowing across the unit, and particularly between the radiants 23 and the grill 10. As a result, the air cannot cool the radiants 23. Each one of them will radiate its heat upwardly toward the grid 10, resulting in substantially uniform heating of air contacting the radiants 23 and the heated air passing upwardly between the grid bars 51 and to the food products mounted thereon.

In order to maintain the temperature of the lower portion of the unit and the grease pan 25 and grease can 28 at a relatively low level, for example, less than 200° F., a baffle arrangement is provided below the burners 24. As disclosed, a heat deflector 80 is supported from the lower end of each burner 24 and extends along substantially its entire length. As shown, the heat deflector is of generally inverted V-shape, the burner 24 having a plurality, such as a pair, of longitudinally spaced depending lugs 81 integral therewith which extend through companion openings 82 in the central portion of the deflector 80, a cotter pin 83, or other suitable holding element, passing through a hole in each lug to prevent dropping of the deflector from the burner 24. For the purpose of insuring the presence of a gap or space 84 between each deflector 80 and the burner 24 thereabove, and thereby prevent conducting of heat from the burner to the deflector, the burner has a plurality of spaced, downwardly projecting studs 85 that will engage the central portion of the deflector. The deflector 80 is mounted centrally under the burner 24, the deflector having an overall width greater than the width of the burner and of the radiant 23 mounted thereabove. Adjacent deflectors 80 are spaced from one another to provide gaps 86 therebetween through which secondary air can flow, to insure complete combustion of the gas, or other fuel, emanating from the burners 24.

The deflectors 80 prevent or greatly minimize the radiation of heat in a downward direction from the hot radiants 23, which may have a temperature of anywhere from 800° F. to 1100° F., and also reduces the convection of heat in a downward direction. Accordingly, the heat loss in a downward direction is considerably reduced. The temperature in the lower portion of the unit and in the drip pan 25 and grease can 28 is held at a low level, which, actual experience has indicated, is less than 200° F.

With the broiler unit illustrated and described, not only are the heat losses in a downward direction from the radiants 23 and burners 24 reduced considerably, by virtue of the provision of the baffles 80, but the heat losses in an upward direction are greatly reduced. In view of the overlapping relation between the inclined adjacent grid bars 51, direct radiation of heat from the radiants to regions above the grid 10 is almost entirely eliminated. Similarly, the flow of heated air and products of combustion is restricted or baffled by virtue of the necessity for striking the inclined grid bars 51 and then passing therebetween. In other words, free upward flow of heated air, and the like, is retarded, providing more time for the heat to be transferred to the grid bars 51 and to the food resting thereon. As a result, the broiler unit will operate with a substantially lesser heat input. In addition, in starting up one of the units, a much lesser time is taken for the radiants 23 to be heated to their proper operating temperature and for the grid 10 to be heated to its desired operating temperature.

The grid sections 17 can be cleaned easily. A suitable tool (not shown) having teeth can be inserted into the channels 70 of the grid bars at their rear and moved in a forward and downward direction toward the front, the grease and relatively hardened particles on the grid being moved in advance of the tool and through the open front ends of the grid bars into the primary gutter 19. The entire length of the grid bars 50 is easily cleaned in view of the absence of obstructions to the passage of the cleaning tool.

I claim:

1. In a grid for supporting food to be cooked: a plurality of parallel bars disposed in side-by-side adjacency, the upper and lower edges of said bars being parallel to each other, means spacing said bars from each other to provide generally vertical passages therebetween open at the tops and bottoms thereof, said bars having upwardly opening channels extending lengthwise thereof, the base of each channel extending generally diagonally of its bar from a location closely adjacent the rear upper side of said bar toward a location closely adjacent the front lower side of said bar, whereby said channels are inclined in a forward and downward direction.

2. In a grid for supporting food to be cooked as defined in claim 1; wherein the sides of said bars are inclined to a vertical plane extending lengthwise of and parallel to said bars.

3. In a grid for supporting food to be cooked as defined in claim 1; wherein the sides of said bars are inclined to a vertical plane extending lengthwise of and parallel to said bars, said bars overlapping one another.

4. In a grid for supporting food to be cooked as defined in claim 1; the forward ends of the spaces between said bars being unobstructed and the forward ends of said channels being open.

5. In a broiler: a structure having a front support and a rear support; a cooking grid resting upon said front and rear supports, said grid having a first groove facing normally downwardly and receiving said rear support to incline the normal upper surface of said grid to the horizontal and in a forward and downward direction, said grid having a second groove facing normally upwardly and adapted to receive said rear support when said grid is inverted to face the normal lower surface of said grid upwardly and position said upwardly facing lower surface in a horizontal plane; said rear support restricting forward and rearward movement of said grid member when located in each of said grooves.

6. In a broiler as defined in claim 5; said grid having spaced lugs extending rearwardly from the main portion of said grid and in which said first and second grooves are provided, said first groove being disposed below the normal lower surface of said grid, said second groove being disposed below the normal upper surface of said grid.

7. In a broiler as defined in claim 5; said front support being channel-shaped to receive grease flowing along said grid to its forward portion.

8. In a broiler as defined in claim 5; said cooking grid comprising a plurality of parallel bars disposed in side-by-side adjacency, means spacing said bars from each other, said bars having upwardly opening channels extending lengthwise thereof, the base of each channel extending generally diagonally of its bar from the rear upper side of said bar toward the front lower side of said bar, whereby said channels are inclined in a forward and downward direction.

9. In a broiler as defined in claim 5; said cooking grid comprising a plurality of parallel bars disposed in side-by-side adjacency, means spacing said bars from each other, said bars having upwardly opening channels extending lengthwise thereof, the base of each channel extending generally diagonally of its bar from the rear upper side of said bar toward the front lower side of said bar, whereby said channels are inclined in a forward and downward direction; said front support being channel-shaped to receive grease flowing along said bars to their forward portion.

10. In a broiler: a rear support; a front main grease collecting channel; a supplementary grease collecting channel contiguous with and rearwardly of said main channel; a cooking grid resting upon said rear support and main channel with the forward end of said grid extending across said supplementary channel and positioned over said main channel so that grease from said forward end can drop into said main channel; the rear side of said supplementary channel being spaced from and below said grid to enable grease flowing along the bottom of said grid and across said rear side to drop into said supplementary channel.

11. In a broiler as defined in claim 10; said grid comprising parallel bars for supporting food to be cooked, said bars being inclined in a downward and forward direction.

12. In a broiler: a rear support; a front main grease collecting channel; a supplementary grease collecting channel adjacent to and rearwardly of said main channel; a cooking grid resting upon said rear support and main channel with the forward end of said grid extending across said supplementary channel and positioned over said main channel so that grease from said forward end can drop into said main channel; the rear side of said supplementary channel being spaced from and below said grid to enable grease flowing along the bottom of said grid and across said rear side to drop into said supplementary channel; said grid comprising a plurality of parallel bars disposed in side-by-side adjacency, means spacing said bars from each other, said bars having upwardly opening channels extending lengthwise thereof, the base of each channel extending generally diagonally of its bar from the rear upper side of said bar toward the front lower side of said bar, whereby said channels are inclined in a forward and downward direction toward said main grease collecting channel.

13. In a broiler as defined in claim 12; said parallel bars being inclined to the vertical and overlapping one another.

14. In a broiler as defined in claim 12; said parallel bars being inclined to the vertical and overlapping one another; the forward ends of the spaces between said bars being unobstructed and the forward ends of said channels being open.

15. In a broiler as defined in claim 5; said grid having spaced lugs extending rearwardly from the main portion of said grid and in which said first and second grooves are provided, said first groove being disposed below the normal lower surface of said grid, said second groove being disposed below the normal upper surface of said grid; said cooking grid comprising a plurality of parallel bars disposed in side-by-side adjacency, means spacing said bars from each other, said bars having upwardly opening channels extending lengthwise thereof, the base of each channel extending generally diagonally of its bar from the rear upper side of said bar toward the front lower side of said bar, whereby said channels are inclined in a forward and downward direction, said front support comprising a main grease collecting channel on which the forward ends of said bars rest, a supplementary grease collecting channel adjacent to and rearwardly of said main channel, the forward portions of said grid bars extending across said supplementary channel and positioned over said main channel so that grease from said forward end portions can drop into said main channel, the rear side of said supplementary channel being spaced from and below said grid bars to enable grease to flow along the bottom of said grid bars and across said rear side to drop into said supplementary channel.

16. In a broiler: a supporting structure; a burner carried by said structure; a radiant member above and spaced from said burner to be heated thereby; a cooking grid above said radiant member; and means for supporting said radiant member in spaced relation above said burner comprising instrumentalities connected to said burner and carrying said radiant member; wherein said means for supporting said radiant member comprises a support secured to the rear of said structrue and on which the rear portion of said radiant member rests, and said instrumentalities comprise a vertical rod secured to said burner and on which the front portion of said radiant member rests.

17. In a broiler: a supporting structure; burner means carried by said structure; a plurality of radiant members above said burner means to be heated thereby; a cooking grid above and spaced from said radiant members; each of said radiant members comprising a main body portion and a baffle extending along said main body portion and projecting upwardly therefrom toward said grid.

18. In a broiler as defined in claim 17; the main body portion of each radiant member being of substantially inverted V-shape in cross-section, said baffle extending upwardly from the apex of said body portion.

19. In a broiler as defined in claim 17; said burner means comprising a plurality of parallel burners, a radiant member being disposed directly above each burner, means for supporting each radiant member comprising a support secured to the rear of said structure and on which the rear portion of said radiant member rests, and a vertical rod secured to a burner underlying a radiant member and on which the front portion of said radiant member rests.

20. In a broiler: a supporting structure; a burner carried by said structure; a radiant member directly above said burner; a cooking grid above said radiant member; and a heat deflector completely below and extending along said burner and carried by and substantially entirely spaced from said burner.

21. In a broiler as defined in claim 20; in which a plurality of parallel burners are carried by said structure, said burners being spaced from each other, a radiant member being disposed above each burner, said radiant members being spaced from each other, one of said deflectors being disposed below each burner, said deflectors being spaced from each other.

22. In a broiler as defined in claim 20; in which said deflector is of inverted V-shape in cross-section, said deflector being in spaced relation to said burner and being carried by said burners by means engaging the apex portion of said deflector.

23. In a broiler as defined in claim 12; said parallel bars being inclined to the vertical and overlapping one another; the forward ends of the spaces between said bars being unobstructed and the forward ends of said channels being open; a plurality of parallel burners carried by said structure; a radiant member between each burner and grid to be heated by said burner, means for supporting each of said radiant members comprising a support secured to the rear of said structure and on which the rear portion of said radiant member rests, and a vertical rod secured to said burner and on which the front portion of said radiant member rests.

24. In a broiler as defined in claim 12; said parallel bars being inclined to the vertical and overlapping one another; the forward ends of the spaces between said bars being unobstructed and the forward ends of said channels being open; a plurality of parallel burners carried by said structure; a radiant member between each burner and grid to be heated by said burner, means for supporting each of said radiant members comprising a support secured to the rear of said structure and on which the rear portion of said radiant member rests, and a vertical rod secured to said burner and on which the front portion of said radiant member rests, each of said radiant members comprising a main body portion and a baffle extending along said main body portion and projecting upwardly therefrom toward said grid.

25. In a broiler as defined in claim 12; said parallel bars being inclined to the vertical and overlapping one another; the forward ends of the spaces between said bars being unobstructed and the forward ends of said channels being open; a plurality of parallel burners carried by said structure; a radiant member between each burner and grid to be heated by said burner, means for supporting each of said radiant members comprising a support secured to the rear of said structure and on which the rear portion of said radiant member rests, and a vertical rod secured to said burner and on which the front portion of said radiant member rests, a heat deflector below and extending along each of said burners and carried by said burner, each deflector being of inverted V-shape in cross-section, said deflectors being in spaced relation to said burners and in spaced relation to one another, each deflector being carried by a burner thereabove by means engaging the apex portion of said deflector.

References Cited

UNITED STATES PATENTS

| | | | |
|---|---|---|---|
| 347,822 | 8/1886 | Newell | 99—445 |
| 541,534 | 6/1895 | Haffcke. | |
| 1,010,169 | 11/1911 | Noreck. | |
| 1,932,743 | 10/1933 | Kunz | 158—113 XR |
| 1,954,476 | 4/1934 | Gloekler | 126—41 XR |
| 1,956,387 | 4/1934 | Hartman | 99—446 |
| 1,959,657 | 5/1934 | Chambers. | |
| 2,052,067 | 8/1936 | Zeimet | 126—41 XR |
| 2,060,004 | 11/1936 | Ebberts | 99—446 |
| 2,076,479 | 4/1937 | O'Connell. | |
| 2,881,695 | 4/1959 | Di Pietro | 99—446 |
| 2,980,101 | 4/1961 | Anetsberger et al. | 99—425 XR |
| 2,985,097 | 5/1961 | Nevin et al. | |
| 3,308,747 | 3/1967 | Spagnolo | 99—446 XR |

FOREIGN PATENTS

| | | |
|---|---|---|
| 240,951 | 1/1960 | Australia. |
| 717,320 | 10/1931 | France. |
| 936,111 | 2/1948 | France. |

WALTER A. SCHEEL, *Primary Examiner.*

JOHN M. NEARY, *Assistant Examiner.*

U.S. Cl. X.R.

99—446, 447